United States Patent [19]

Conley et al.

[11] Patent Number: 4,988,077
[45] Date of Patent: Jan. 29, 1991

[54] REINFORCED PLASTIC VALVE

[75] Inventors: Richard W. Conley; Richard P. Tremblay, both of Pittsburgh, Pa.

[73] Assignee: Kerotest Manufacturing Corp., Pittsburgh, Pa.

[21] Appl. No.: 483,924

[22] Filed: Feb. 23, 1990

Related U.S. Application Data

[63] Continuation of Ser. No. 308,787, Feb. 8, 1989, abandoned, Ser. No. 873,712, Jun. 12, 1986, abandoned, and Ser. No. 740,228, Jun. 3, 1985, abandoned.

[51] Int. Cl.⁵ .............................................. F16K 5/04
[52] U.S. Cl. .................................... 251/309; 251/366
[58] Field of Search ................ 251/304, 309, 358, 366, 251/368

[56] References Cited

U.S. PATENT DOCUMENTS 3,526,386  9/1970  Gachot ................................. 251/366
4,171,711 10/1979  Bake et al. ....................... 251/309 X
4,494,730  1/1985  George ................................ 251/309

Primary Examiner—John C. Fox
Attorney, Agent, or Firm—Stanley J. Price, Jr.

[57] ABSTRACT

A reinforced plastic valve includes a generally cylindrical major body portion which is at least partially formed of a plastic material. The major body portion has an axially extending interior chamber. A pair of flow lines intersect the major body portion and the interior chamber thereof. A plug is mounted in the chamber and is selectively rotatable to control flow of fluid through the flow lines. The major body portion includes a reinforcing sleeve formed of metal which is encased within the plastic major body portion to surround the interior chamber.

2 Claims, 3 Drawing Sheets

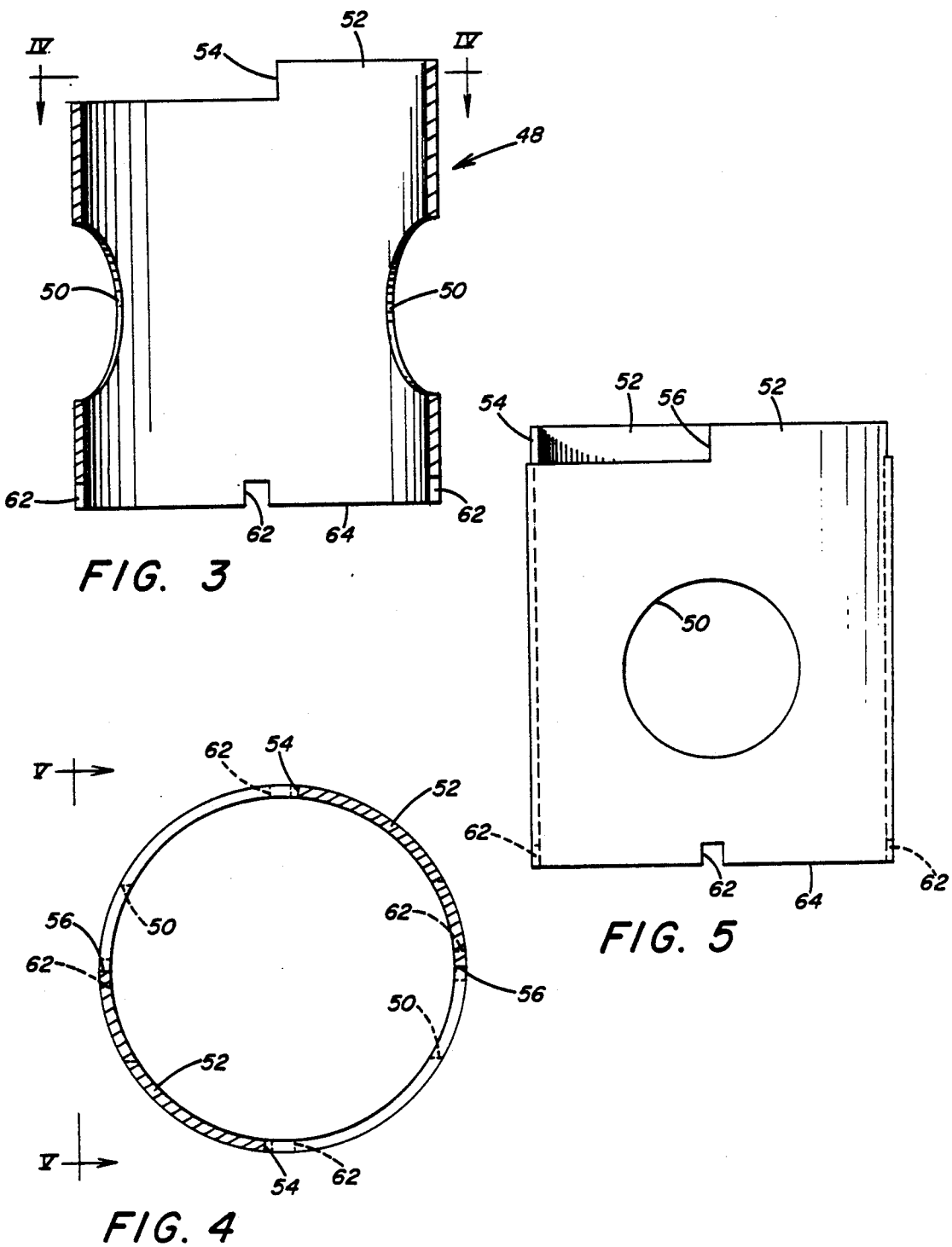

REINFORCED PLASTIC VALVE

CROSS REFERENCE TO RELATED APPLICATIONS

This application is a continuation of copending application Ser. No. 308,787 filed Feb. 8, 1989, now abandoned and Ser. No. 873,712 filed on June 12, 1986 now abandoned, and a continuation of Ser. No. 740,228, filed on June 3, 1985, entitled "Reinforced Plastic Valve", now abandoned.

BACKGROUND OF THE INVENTION

1. Field of the Invention

This invention relates to a reinforced plastic valve and, more specifically, to such a plastic valve which should be capable of operating at higher pressure ratings for an extended period of time.

2. Description of the Prior Art

Plastic valves, such as those disclosed in U.S. Pat. Nos. 4,014,513; 4,171,711; 4,234,011; and 4,488,741, have recently been satisfactorily and successfully employed for the flow control of numerous types of fluids in various piping systems and in a wide range of environmental conditions. However, because of the nature of plastic, there have heretofore been some limitations on the amount of fluid pressure which should be allowed in systems which employ plastic valves. For example, it has been found that, when various plastic valves have been utilized in systems which have a relatively high operating pressure, after an extended period of time, the valve plug and/or valve body can experience "creep" which alters the design dimensions of the valve and/or plug to decrease its overall efficiency and reliability.

"Creep" can be defined as progressive strain without increased stress. If one is free to select alternative materials of construction, it is possible to eliminate any real concern for "creep". However, there are instances where the plastic body material must be identical to that of the piping system. For example, if the body is to be fused to the pipes in the system, the same material is required for a proper union. The piping could display high "creep" characteristics and still be reliable while the same "creep" in the body could alter its dimensions and reduce the reliability of sealing around the plug which prevents leakage and sealing at the valve seat which controls flow through the valve.

Although not specifically related to the type of valve of the present invention, U.S. Pat. No. 3,092,365 discloses a rubber plug for a valve which is basically formed around and reinforced by an internal metal structure. Other types of valves have employed inserts in various types of closure members and in various areas of the valve body to generally solve different problems than that of "creep" as described hereinabove. For example, U.S. Pat. No. 3,133,722 discloses a sleeve liner which can be made of plastic material but is intended to serve as a backing material for a tapered plug member which is primarily intended to function as the closure device for the valve. U.S. Pat. No. 4,303,223 discloses valve facing strips of a fire hydrant valve which are primarily intended to provide a reliable, low friction working surface for the axial movement of the valve disclosed therein.

Additional patents disclose some form of sleeve or reinforcing element which are not primarily intended to strengthen the valve body but are instead intended to insure proper sealing of the valve during closure. For example, U.S. Pat. No. 3,061,269 discloses an internal sleeve which can be made of numerous types of material but is primarily intended to provide a surface having a low-coefficient of friction for the rotation of the valve closure member disclosed therein. Similarly, U.S. Pat. Nos. 3,244,389 and 3,398,925 disclose ball valves which have annular reinforcing means at the edge seals thereof to insure that proper sealing is maintained against the surface of the ball to prevent the loss of fluid from the flow passages thereof.

U.S. Pat. No. 3,091,428 discloses a metallic ball valve and U.S. Pat. Nos. 3,192,945 and 3,913,610 disclose matallic butterfly valves which are primarily intended for use in metal piping systems. The ball valve of U.S. Pat. No. 3,091,428 includes a central cylindrical ring section which primarily supports the ball and to which identical cups are joined to form the composite valve. Similarly, the butterfly valves of U.S. Pat. Nos. 3,192,945 and 3,913,610 disclose cylindrical metallic sleeves or body portions which primarily rotatably support the butterfly closure members thereof. These valves include the provision of a lining or interior coating for the cylindrical metallic portion which is formed of resiliant rubber-like, plastic, or synthetic material to provide the sleeve with erosion and/or corrosion protection.

More significantly, U.S. Pat. No. 4,348,006 discloses a butterfly-type valve having a plastic body portion with a valve seat formed by a metal sleeve molded within and sealed to the plastic valve body portion with an annular rubber sleeve insert vulcanized to the metal sleeve. The metal sleeve is intended to prevent migration or "creep" of the elastomeric insert but additional sealing means between the metal sleeve and the plastic body portions is employed to insure that there will be no fluid leakage therebetween.

Finally, although not intended to reinforce the valve body thereof or to qualify the valve for use with fluids operating at higher pressures, U.S. Pat. No. 3,526,386 discloses a plastic valve having a metallic sleeve which is inserted in and embedded within the flow line thereof. The sleeve is said to "reinforce" the flow line but is primarily utilized to provide a stronger, reinforced coupling means for installing the plastic valve within a piping system.

Consequently, there remains a need for providing a plastic valve which includes means for insuring that the valve can be satisfactorily employed in fluid systems of higher pressure without any detriment thereto over an extended period of time.

SUMMARY OF THE INVENTION

In accordance with the present invention, there is provided a reinforced plastic valve including a generally cylindrical major body portion at least partially formed of a molded plastic material and having an axially extending interior chamber. A pair of flow lines intersect the major body portion and the interior chamber thereof. A flow isolation member is mounted in the chamber and selectively movable to control the flow of fluid through the flow lines. The major body portion includes reinforcing means formed of a reinforcing material stronger than the molded plastic material embedded within said molded plastic material to at least partially surround surrounding the interior chamber.

Also in accordance with the present invention, there is provided a reinforced plastic valve body structure including a generally cylindrical major body at least partially formed of a molded plastic material and having an axially extending interior chamber which is capable of receiving a movable flow isolation member therein. A pair of flow lines intersect the body and the major body portion includes reinforcing means formed of a reinforcing material stronger than the molded plastic material embedded within said molded plastic material to at least partially surround the chamber.

Further, in accordance with the present invention, there is provided a method of forming a generally cylindrical valve body including the steps of forming a sleeve of reinforcing material into a generally cylindrical shape. The sleeve is installed within a valve body mold. Plastic material is injected into the mold to at least partially surround the sleeve. The molded plastic material is allowed to set to retain the sleeve within the valve body.

Accordingly, it is an object of the present invention to provide a valve which includes a plastic body which is reinforced to allow the valve to be utilized in fluid systems of higher pressure for an extended period of time without any loss of reliability thereof.

It is a further object to provide such a valve where the body can be formed of a particular plastic material which is identical to that which is considered appropriate for the piping system to enable the body to be properly fused to the pipe.

It is another object of the invention to provide a method of forming such a valve by installing a sleeve of reinforcing material at least partially embedded within the plastic material of the body thereof.

These and other objects of the present invention will be more completely disclosed and described in the following specification, the accompanying drawings, and the appended claims.

DETAILED DESCRIPTION OF THE DRAWINGS

FIG. 3 is a sectional view of the preferred reinforcing sleeve oriented in a manner similar to its orientation in FIG. 1.

FIG. 4 is a view of the preferred sleeve as seen along line 4—4 of FIG. 3.

FIG. 5 is an elevational view of the preferred sleeve as seen along line 5—5 of FIG. 4.

DESCRIPTION OF THE PREFERRED EMBODIMENTS

Figure 1:
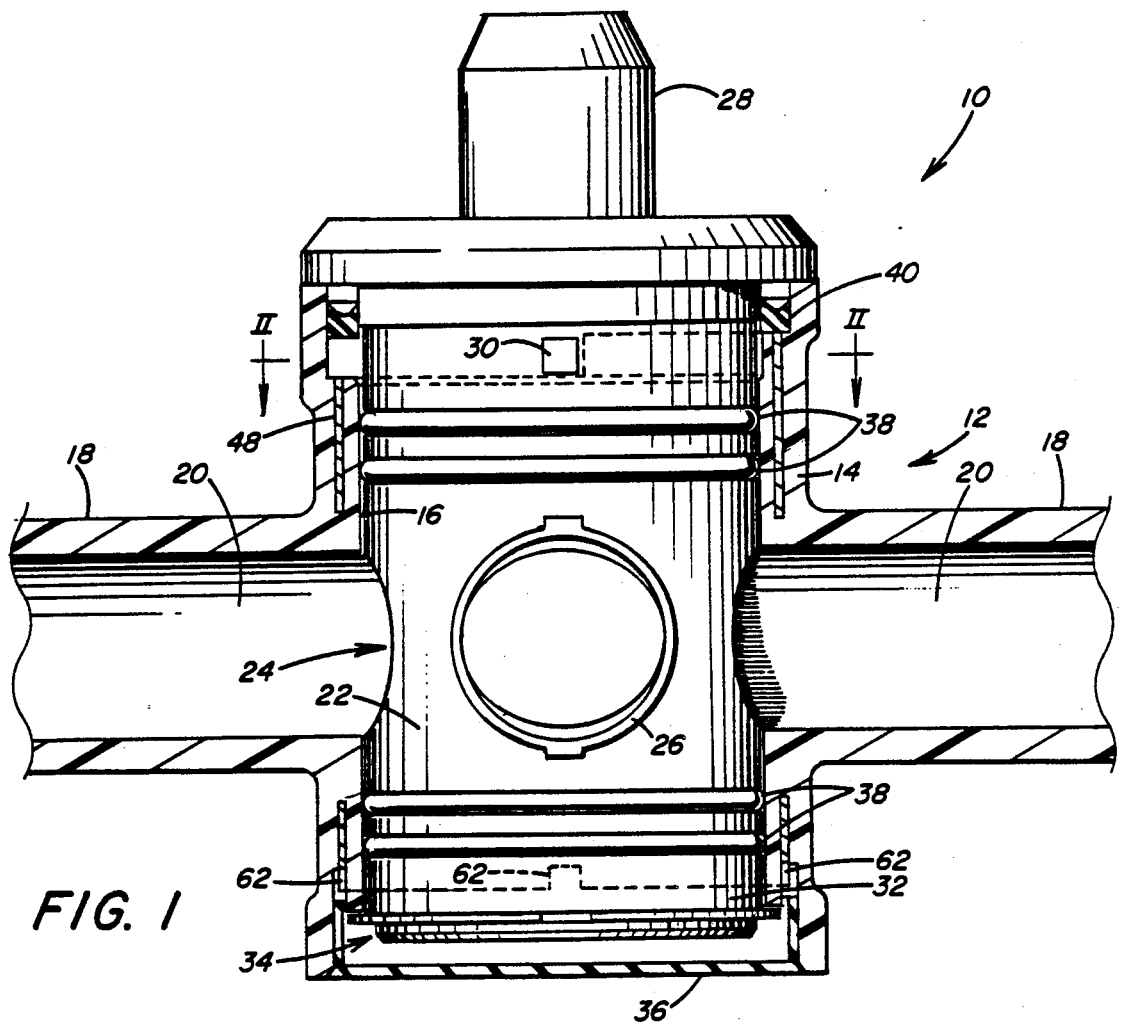
FIG. 1 is an elevational view partially in section of a preferred valve including various features of the invention.

As seen in FIG. 1, a preferred valve 10 is primarily formed of molded plastic and includes a valve body 12 having a generally cylindrical body 14 with an axially extending interior chamber 16. A pair of flow lines 18 of the body structure 12 are preferably integrally formed with and intersect the body 14 and include flow passages 20 thereof which intersect the chamber 16. A rotatable flow isolation member in the form of a plug 22 is mounted within the chamber 16 to be capable of being selectively positioned to allow or prevent flow through the flow passages 20.

Specifically, as seen in FIG. 1, the plug 22 includes a transverse opening 24 therethrough to allow flow through the flow passages 20 and opposing seats 26 which can be aligned with the passages 20 when the plug 22 is rotated to prevent the flow of liquid therethrough. The plug 22 includes a handle 28 and at least one radially extending rotational stop element 30 which will be discussed in detail hereinbelow. Further, the lower end 32 of the plug 22 includes a groove and retaining means 34 for preventing withdrawal of the plug 22 from the chamber 16 after it has been installed within the body portion 14. A sealed bottom 36 is added to the body portion 14 after installation of the plug 22 therein to prevent dirt or ice from forming at the bottom of the valve 10 and interfering with the rotation of the plug 22. The preferred plug 22 is provided a plurality of O-ring seals 38 to primarily retain fluid within the flow passages 20 and the transverse opening 24 of the plug 22 and prevent leakage at the top or bottom of the plug 22 during normal use of the valve 10. A sealing ring 40 is also provided to the top of the valve 10 to prevent the ingress of fluid or contaminates into the chamber 16 around the top of the plug 22. If "creep" were allowed to occur to the body 14, proper sealing contact between the O-ring seals 38 and seats 26 and the chamber 16 could not be maintained and leakage through the valve 10 and to the atmosphere could occur.

Figure 2:
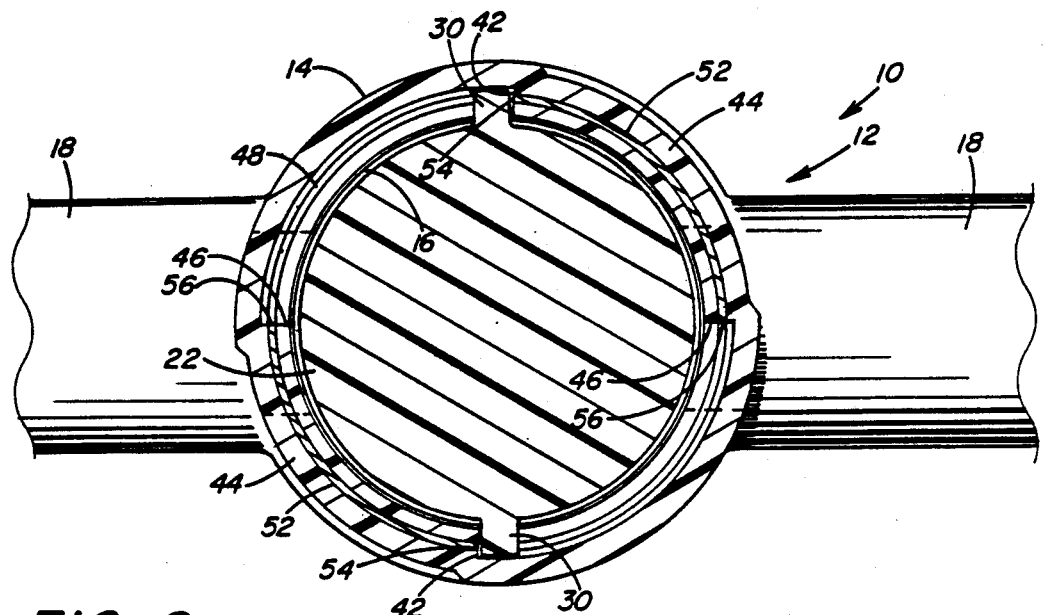
FIG. 2 is a view of the preferred valve as seen along 2—2 in FIG. 1.

As seen in FIG. 2, the preferred plug 22 includes two radially extending rotational stop elements 30 which are shown in a position for allowing flow through the valve 10. The rotational stop elements 30 are prevented from rotation in a clockwise direction by respective abutting contact with the ends 42 of a pair of axially extending sectors 44 of the body 14. Rotation of the plug 22 in a counter-clockwise direction would cause the rotational stop elements 30 to make contact with the other ends 46 of the axially extending sectors 44 of the body 14 to insure that the seats 26 are properly aligned with the flow passages 20 when the valve 10 is closed. It should be noted that each of the sectors 44 extends less than ninety degrees to accommodate for the thickness of the stop elements 30 while allowing a full ninety degree rotation of the plug 22. Clearly, the sectors 44 and stop elements 30 might be oriented to any circumferential location around the plug 22 and body 14 as long as the opening 24 and seats 26 will be properly alignable with the flow passages 20. It would also be obvious to alter the preferred valve 10 to include only one stop element and one sector of approximately two hundred-seventy degrees for similar limitations on the rotation of the plug.

As thus described, the preferred valve is similar to the valve disclosed in U.S. Pat. Nos. 4,014,513; 4,171,711; 4,324,011; and 4,488,741. Although the valves disclosed therein have been satisfactorily employed, the preferred valve 10 includes features which could accommodate a higher pressure rating while being formed of a plastic material which is identical to that selected for the piping system in which it is to be employed. As mentioned hereinabove it has been found that when some plastic valves are subjected to higher operating pressures over an extended period of time, the body can experience "creep" where the design dimensions tend to change to interfere with the overall integrity of the plug as installed in the valve body and reduce the efficiency of the sealing of the valve. Accordingly, the preferred valve 10 includes a preferred body 14 which includes reinforcing means formed of a reinforcing material which is stronger than the molded plastic material.

The preferred reinforcing means is in the form of a sleeve 48 which extends around the body 14. As best seen in FIGS. 3, 4, and 5, the preferred sleeve 48 is formed of metal and is generally cylindrical to completely encircle the body 14. A pair of openings 50 are formed through the sleeve 48 and are to be aligned with the flow passages 20 of the flow lines 18.

Additionally, it will be noted that the preferred sleeve 48 includes axially extending portions 52 at the upper end thereof which portions 52 will lie within the pair of axially extending sectors 44 of the body portion 14. As a result, the axially extending portions 52 each include ends 54 which are aligned with the ends 42 of the sectors 44 and ends 56 which are aligned with the ends 46 of the sectors 44. As a result, with the sleeve 48 properly embedded within the body 14, the sleeve 48 will tend to reinforce the body 14 and further insure that there is adequate strength in the axially extending sectors 44 for properly serving as a means to limit rotation of the plug 22 throughout the life of the valve 10. In fact, it is significant that the sectors 44 be sufficiently stronger than the stop elements 30 to insure that the stop elements 30 will be cleanly severed from the plug 22 if one tries to force the rotation of the plug 22 by the sectors 44. It is better for the stop elements to be cleanly removed than to allow forced rotation of the plug 22 to result in its being directly damaged in a manner which would interfere with its ability to selectively control flow through the valve.

As shown in FIGS. 1 through 5, it should be clear that the preferred sleeve 48 is at least partially encased within the plastic material of the body 14. In other words, the sleeve 48 will properly add reinforcement to the body 14 but will not generally be exposed to the environment or to the fluid within the flow passages 20 or the interior chamber 16. Since it is not exposed to the fluid in the valve 10, there is no need to be concerned with any leakage around the sleeve 48 which might otherwise occur. Further, since the preferred reinforcing sleeve 48 does not extend to the interior surface of the interior chamber 16, the preferred plug 22 will rotate and provide sealing as if it were installed within an entirely plastic body 14.

As thus described, it is expected that the reinforcing sleeve 48 will prevent creep which may otherwise have existed in the major body portion 14. It is also expected that the sleeve 48 will be properly retained within the major body portion 14 by the incasement of the sleeve 48 within the plastic material of the major body portion 14. However, should there turn out to be some localized movement of the plastic material of the major body portion 14, it would be possible to provide rounded edges for the openings 50 to insure that no cracks or other failure of the plastic material develops at the edges of the holes 50. Additionally, although the sleeve 48 should remain in place since it is encased in the molded plastic material, an alternative configuration could include a plurality of radially extending holes at various locations around the sleeve 48 to cause the plastic material to flow therethrough when the body 14 is being formed by molding. Since the plastic material may not directly adhere to the metal of the sleeve 48, the additional holes would further insure that there is a complete incasement of the sleeve 48 within the plastic material. With the plastic material extending through such a plurality of holes in the sleeve 48, the sleeve 48 would be further secured within the body 14 to resist any rotational forces created by the stop elements 30 during rotation of the plug 22.

Figure 6:
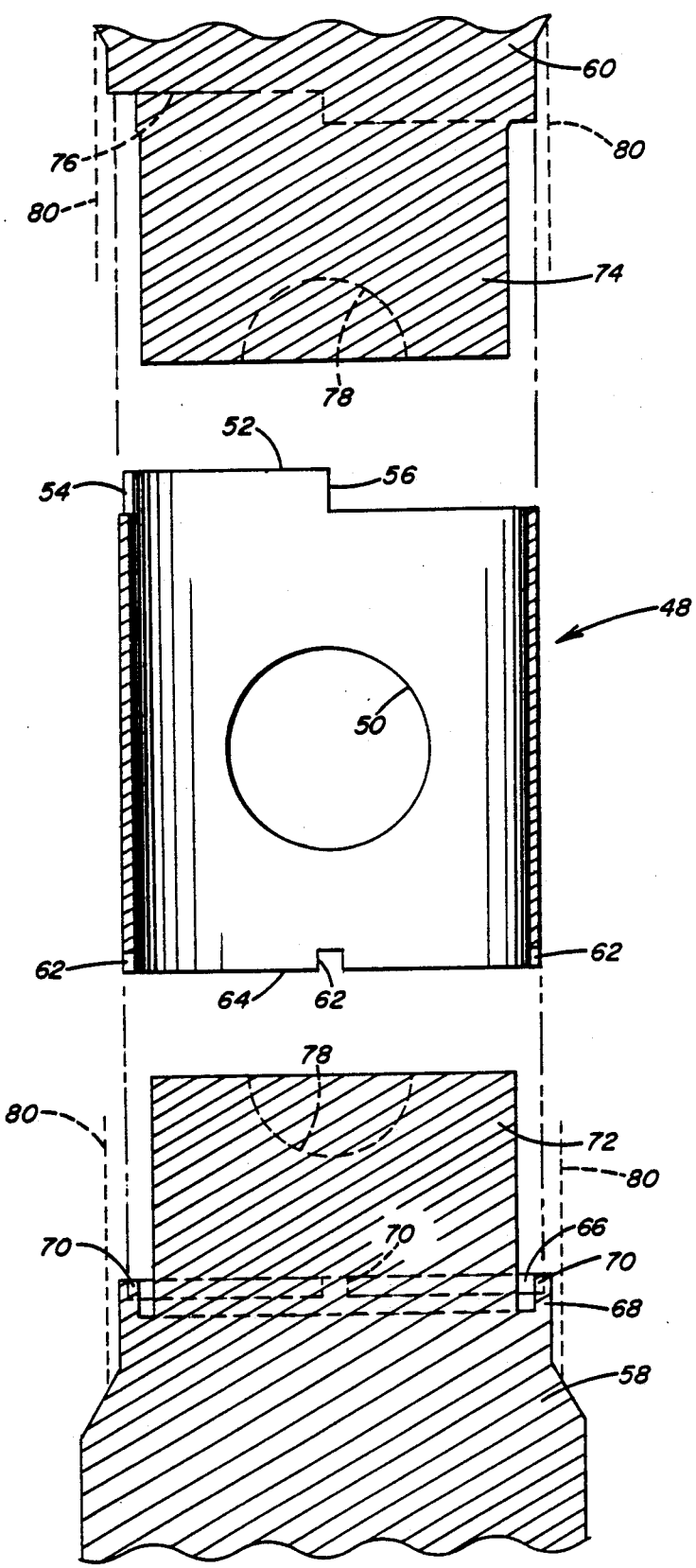
FIG. 6 is an exploded view partially in section of the preferred sleeve including its method of formation within a plastic valve body mold and various features of the invention.

To provide the valve 10 with the included reinforcing sleeve 48, the preferred method of forming the valve body structure 12 includes means for insuring that the sleeve 48 is properly supported and oriented during the plastic valve molding process. Specifically, as seen in FIG. 6, a bottom core 58 and a top core 60 of the basic valve body mold are utilized to properly support and orient the preferred sleeve 48. Additional portions of the valve body structure mold have been eliminated from FIG. 6 in order to be able to properly demonstrate those portions which are essential to an understanding of the overall method of forming the valve body structure 12. For example, the valve body mold would preferably includes a pair of passage cores for forming the flow passages 20 which passage cores intersect with and join the bottom core 58 and top core 60. Lastly, the valve body mold primarily includes an external mold which is formed of two halves for the formation of the exterior of the valve body 12. It should be understood that the injection molding of plastic material of the type used to form the preferred valve body 12 is well known in the art. For example, if one were to provide any of the plastic valves mentioned as the prior art hereinabove, it would be quite common to inject plastic material into a valve body mold of the general type described and to allow the plastic material to set prior to disassembly of the mold and removal of the cores therefrom.

However, in order to specifically support and orient the sleeve 48, the preferred sleeve 48 includes four evenly-spaced notches 62 in the lower edge surface 64 thereof. The bottom core 58 includes a shoulder 66 on an upwardly extending cylindrical portion 68 thereof for receipt of the lower edge surface 64 of the sleeve 48 thereon. The shoulder 66 has four evenly-spaced tabs 70 which are alignable with the notches 62 for respectively receiving them thereon. Consequently, with the sleeve 48 installed on the cylindrical portion 68 of the bottom core 58, the sleeve 48 is concentrically positioned on the core 58 and separated from a center portion 72 thereof which is intended to partially form the interior chamber 16. Further, because of the orientation of the notches 62 and the tabs 70, the sleeve 48 can be positioned on the bottom core 58 with the openings 50 properly aligned for the formation of the flow lines 18.

Once the sleeve 48 is properly supported by the bottom core 58, the top core 60 can be joined to the bottom core 58 as the center portion 74 thereof combines with the center portion 72 of the bottom core 58 to complete the form needed for the interior chamber 16. The top core 60 includes circumferential recessed portions 76 for receipt of the axially extending portions 52 of the sleeve 48 for the eventual formation of the axially extending sectors 44 of the body 14.

After the bottom core 58 and the top core 60 are joined in this manner with the sleeve 48 properly positioned therebetween, the openings 50 of the sleeve 48 are aligned with a pair of cavities 78 at opposite sides of the combined center portions 72, 74. The cavities 78 are intended to receive the interior end of the passage cores mentioned hereinabove. It should be clear that the passage cores could be formed as a single long core extending through the bottom core 58 and the top core 60 so that the cavities 78 would alternatively extend all the way therethrough. In either case, sleeve 48 is aligned with the passage cores to allow the formation of the flow passages 20 of the flow lines 18. When the exterior halves of the valve body mold are fully installed, as generally represented by the dotted lines 80 to show their relationship to the cores 58, 60, the exterior walls of the body 14 will be formed with an outside diameter larger than the exterior diameter of the sleeve 48. Accordingly, sufficient plastic material will be formed around the exterior of the sleeve 48 to primarily encase the sleeve 48 within the preferred body 14. Since the passage core and the exterior halves of the valve body mold does not make any contact with the sleeve 48, the sleeve 48 is surrounded by the plastic material at all locations other than those where there is direct contact with the cores 58, 60. Consequently, the sleeve 48 is located radially within the cylindrical wall of the body 14 to include the plastic material internally and externally thereof.

It should be clear that, after the entire valve body mold is assembled, plastic material can be injected into the mold to at least partially surround the sleeve 48. After the molded plastic material has been allowed to set and the exterior mold and interior cores are removed, the sleeve 48 will be retained within the molded valve body structure 12.

Although the preferred sleeve 48 is primarily intended to reinforce the body 14 throughout use of the valve 10, it is possible that the sleeve 48 may provide an added benefit during formation of the body 14. It has been found that when a body without an encased sleeve has been molded in the manner generally described hereinabove, it is not uncommon for the body to be slightly warped upon removal from the mold with the chamber thereof not having a truly cylindrical shape. As a result, the chamber must be machined to provide the required shape for proper receipt of a plug therein. The sleeve 48 being employed in the method of formation of the body 14 as described above could completely eliminate this required step and should, at the least, reduce the amount of machining that may be required. Further, if there is no need for such machining, it has been found that the interior surface of the chamber as formed by the body mold has excellent characteristics for direct installation of the plug therein.

Further, it would clearly for possible for various alterations to be made to the preferred embodiment described hereinabove without departing from the scope of the invention as claimed. For example, it might be advantageous to include only one notch at a lower edge surface of the sleeve to mate with only one tab on the bottom core to insure that there is only one possible orientation of the sleeve relative to the bottom core. Additionally, although the "bottom core" was used to primarily support the sleeve 48 during the formation of the preferred valve body structure 12, it would be possible for either a bottom or a top core to be properly configured for this purpose while still falling within the scope of the invention as claimed.

Although the method of providing the preferred valve body structure 12 is expected to properly encase the sleeve 48 within the plastic molded material, it should be recognized that the bottom core or the top core could be slightly altered to further surround the end edges of the sleeve 48 with plastic material. As one example of any number of ways in which this could be accomplished, the shoulder 66 near each of the evenly spaced tabs 70 could be configured to discontinue a short distance from the tabs 70 to cause the lower edge surface 64 of the sleeve 48 to be separated from any portion of the bottom core 58. With the major circumference of the lower edge surface 64 being separated from any portion of the bottom core 58, the plastic molded material will primarily surround and encase the major circumference of the lower edge surface 64. Such a configuration would still fall within the scope of the invention as claimed since the sleeve would still include a generally radially extending surface which would be installed on a sleeve supporting surface of the valve body mold even though the supporting surface would be circumferentially smaller.

Still further, it should be clear that the preferred sleeve 48 is simply one embodiment which could be utilized to practice the invention as claimed. Specifically, it would be possible for the reinforcing sleeve 48 to be made of some other material while still satisifying the basic criteria of reinforcing the body 14. Additionally, the sleeve need not be made to completely encircle the body 14 and could alternatively be made of some sheet material which could be formed to only partially encircle the body 14. For example, it might be desirable to form the reinforcing sleeve from some sheet metal and simply roll the pre-formed sheet material to only at least partially surround the chamber 16 above and below the flow lines 18. In fact, with some other type of means for supporting a reinforcing sleeve means during an alternative method of forming the body, it would be possible for two separate partially encircling bands of metal to be installed within the interior of the body 14 to effectively prevent any circumferential expansion of the body 14 as might occur over an extended period of time at higher pressures. Although the figures do not show such upper and lower bands of reinforcing material separately in the valve 10, they are shown in the form of corresponding upper and lower parts of the preferred sleeve 48. Additionally, although it is clear from the cylindrical shape of the preferred body 14 that it would be appropriate for the sleeve 48 to have a cylindrical shape, some other type of shape could be provided if such shape would still reinforce a body of a similarly plastic valve. As a result, numerous alterations could clearly be made to the preferred embodiment described hereinabove without departing from the scope of the invention as claimed.

According to the provisions of the patent statutes, we have explained the principle, preferred construction and mode of operation of the invention and have illustrated and described what we now consider to represent its best embodiments. However, it should be understood that, within the scope of the appended claims, the invention may be practiced otherwise than as specifically illustrated and described.

We Claim:
1. A reinforced plastic valve comprising:
a generally cylindrical unitary valve body formed of a molded plastic material having deformable creep properties under pressure, said unitary valve body having a generally cylindrical axially extending interior chamber, said valve body interior chamber having an inner cylindrical wall;
a pair of flow lines each extending into said interior chamber of said valve body;
a flow isolation member having valve seats and a generally cylindrical configuration throughout its length, said flow isolation member mounted in said generally cylindrical chamber and rotatably movable to control the flow of fluid through said flow lines;

seal members positioned on said flow isolation member above and below said flow lines in sealing contact with said valve body inner cylindrical wall;

said valve body including a metal reinforcing member that has deformable creep properties substantially less than the creep properties of said plastic material forming said valve body, said reinforcing member embedded during the molding process within said molded plastic material and encapsulated by said molded plastic material, said reinforcing member being of generally cylindrical shape and having upper and lower portions extending circumferentially within said valve body at locations opposite said seal members on said flow isolation member and on each side of said flow lines and a circumferentially extending intermediate portion having diametrically opposed openings for alignment with said flow lines, said upper portion, said lower portion and said intermediate portion being integrally formed into a metal sleeve having a cylindrical shape extending concentrically with said valve body so that said valve seats will maintain the desired relationship with said valve body;

said reinforcing member preventing creep of said valve body and providing dimensional stability to said valve body to thereby maintain sealing contact between said seal members and said valve body inner cylindrical wall; and said flow isolation member mounted for rotation within said chamber, said flow isolation member having at least one radially extending stop means, said reinforcing member having at least one axially extending shoulder means, said shoulder means operable to limit rotation of said flow isolation member and sever said radially extending stop means on said flow isolation member on over torquing of said flow isolation member.

2. The valve as set forth in claim 1, wherein said flow isolation member includes radially extending rotation stop means aligned with said axially extending shoulder means for limiting said rotation of said flow isolation member and positioning said flow isolation member in a full closed or a full open position.

* * * * *